United States Patent Office 2,716,067
Patented Aug. 23, 1955

2,716,067
DE-ICING COMPOSITION

Jacob M. Fain, Brooklyn, N. Y., and Norman L. Hewitt, Red Bank, N. J., assignors, by mesne assignments, to United States of America as represented by the Secretary of the Navy No Drawing. Application September 26, 1952, Serial No. 311,808

10 Claims. (Cl. 106—13)

This invention relates to compositions having freeze-depressant and de-icing properties with special applicability to aircraft, operating under low temperature conditions.

Numerous freeze-depressants and de-icing substances and compositions are known and employed for maintaining free of ice and frost exposed airplane parts such as wings, fuselage, control units and the like. While many of these known compositions are useful, the conditions of operation of modern planes require the most effective action of these agents not only in preventing ice-formation but in removing ice completely and promptly after formation.

Accordingly, an outstanding object of the present invention is to provide a composition suitable for application to aircraft exteriors which has pronounced de-icing capabilities. A further object is to provide a composition which in addition to heightened de-icing characteristics acts effectively to prevent ice formation. Still another object is to provide a de-icer which is operative at temperatures as low as −65° F.

Other objects of the invention are the provision of a de-icing material which is non-inflammable, which is non-toxic, which is non-corrosive, which has a pour point below −65° F. and which will not crystallize or separate in the normal temperature range of use.

It has been ascertained that the described objects may be attained by suitably proportioned amine-salt mixtures, particularly mixtures of morpholine and potassium acetate, of monoethanolamine and potassium thiocyanate and of ethylene diamine and potassium thiocyanate. Of these binary compositions, I prefer that of ethylene diamine ($NH_2CH_2CH_2NH_2$) and potassium thiocyanate (KCNS) in the following proportions by weight Ethylene diamine _____ 67
Potassium thiocyanate _____ 33

This composition has the following properties

Specific gravity__ 1.13.
Pour point _____ −76° F.
Flash point_____ 203° F.
Corrosion_____ Non-corrosive to aluminum, aluminum alloys, magnesium alloys and steel.

In general, the amine-salt mixtures as above described, and in particular the ethylene diamine-potassium thiocyanate mixture, have outstanding capabilities as de-icing agents. Careful investigation has revealed that freeze-depressant and de-icing actions are not necessarily both equally effective in a de-icing composition. For a freeze depressant, the chief operative factors are solubility, number of ions in solution and the degree of dissociation; but for de-icing capacity there is required, in addition, a high rate of solution in water. In the case of many freeze-depressants the solution rate is sufficient to obtain ice melting at the temperature of water freezing (32° F.), but at temperatures of sixty-five below zero (Fahr.) this is no longer true.

Since the amines are ammonia derivatives or substituted ammonias they possess a high solution rate at low temperatures and thus are peculiarly effective for ice removal when combined with freeze-depressant salts for which they act as solvents.

The preferred proportions by weight of the ethylene diamine-potassium thiocyanate composition has been mentioned. However, these materials are useful within defined range limits as follows:

| | Parts by weight |
|---|---|
| Ethylene diamine | 83.3–57.1 |
| Potassium thiocyanate | 16.7–42.9 |

While the binary composition ethylene diamine and potassium thiocyanate gives outstanding results, the other mixtures mentioned are effective, the preferred proportions and ranges being as follows; using parts by weight:

| Substance | Preferred | Range |
|---|---|---|
| (1) Morpholine | 70 | 95.2–60 |
| Potassium acetate | 30 | 4.8–40 |
| (2) Monoethanolamine | 67 | 91–65 |
| Potassium thiocyanate | 33 | 9–35 |

In addition, it has been discovered that while a morpholine-potassium thiocyanate mixture was unsatisfactory, the addition of a small amount of water made it effective. The following proportions are used.

| | Parts by weight |
|---|---|
| Morpholine | 55–75 |
| Potassium thiocyanate | 30–15 |
| Water | 15–10 |

Also, a mixture of monoethanolamine and potassium acetate was found effective in the specific weight proportions of 91 parts monoethanolamine and 9 parts potassium acetate.

In all of the described mixtures the freezing point is lowered to at least −65° F., the de-icing property is pronounced, corrosive action is absent, and the mix is non-inflammable, non-toxic, has a pour point below −65° F. and will not crystallize or separate in the −65° F. to 170° F. temperature ranges.

Modifications and variations of the described invention may be made in the light of the above teachings. It is therefore understood that within the scope of the appended claims the invention may be practiced otherwise than as specifically described.

What is claimed is:

1. A de-icing composition consisting by weight of ethylene diamine 67 parts and potassium thiocyanate 33 parts.

2. A de-icing composition consisting by weight of ethylene diamine 83.3 to 57.1 parts and potassium thiocyanate 16.7 to 42.9 parts.

3. A de-icing composition consisting of an amine selected from the group consisting of ethylene diamine, morpholine and monoethanolamine and a salt selected from the group consisting of potassium acetate and potassium thiocyanate, the salt forming by weight not less than 4.8 parts and not more than 42.9 parts of the composition.

4. A de-icing composition according to claim 3 to which water has been added.

5. A de-icing composition according to claim 3 characterized by a specific gravity of 1.13 and a pour point of −76° F. to −65° F.

6. A de-icing composition consisting by weight of morpholine 80 to 60 parts, and potassium acetate 20 to 40 parts.

7. A de-icing composition consisting by weight of monoethanolamine 80 to 65 parts and potassium thiocyanate 20 to 35 parts.

8. A de-icing composition consisting by weight of monoethanolamine 67 parts and potassium thiocyanate 33 parts.

9. A de-icing composition consisting by weight of monoethanolamine 91 parts and potassium acetate 9 parts.

10. A de-icing composition consisting by weight of morpholine 70 parts and potassium acetate 30 parts.

References Cited in the file of this patent

UNITED STATES PATENTS

| | | |
|---|---|---|
| 2,333,862 | Hill et al. | Nov. 9, 1943 |
| 2,434,208 | Gaugler et al. | Jan. 6, 1948 |
| 2,451,814 | Dissel et al. | Oct. 19, 1948 |